US005207748A

United States Patent [19]
Katbi et al.

[11] Patent Number: 5,207,748
[45] Date of Patent: May 4, 1993

[54] HIGH PRODUCTIVITY INSERT

[75] Inventors: Karl Katbi, Troy; Thomas J. Bernadic, Madison Heights; Tony M. Lowe, Royal Oak; Brendon L. Brockett, Dearborn Heights, all of Mich.

[73] Assignee: Valenite Inc., Troy, Mich.

[21] Appl. No.: 790,966

[22] Filed: Nov. 12, 1991

[51] Int. Cl.⁵ .............................................. B23B 27/22
[52] U.S. Cl. ..................................... 407/114; 407/116
[58] Field of Search ................ 407/116, 114, 113, 115

[56] References Cited

U.S. PATENT DOCUMENTS

| | | | |
|---|---|---|---|
| 3,875,663 | 4/1975 | Gustafson et al. | 407/114 |
| 4,247,232 | 1/1981 | McCreery et al. | 407/114 |
| 4,288,179 | 9/1981 | Kruger et al. | 407/114 |
| 4,507,024 | 3/1985 | Stashko | 407/114 |
| 4,915,548 | 4/1990 | Fouquer et al. | 407/114 |

Primary Examiner—Steven C. Bishop
Attorney, Agent, or Firm—Bill C. Panagos

[57] ABSTRACT

An indexable improved force distribution cutting insert having a tapered cutting edge along its periphery with the greatest height at each corner of the insert and descending bi-directionally toward the centerline of the insert to define a resultant ridge to improve impact resistance at each corner.

4 Claims, 3 Drawing Sheets

HIGH PRODUCTIVITY INSERT

BACKGROUND OF THE INVENTION

1. Field of the Invention

The present invention relates to a high productivity, high metal removal rate insert which improves force distribution across the rake face and has a cutting surface which is tapered in configuration.

The present invention further relates to an indexable cutting insert having force distribution which lowers stress concentration at depth of cut line. The insert is further equipped with a raised, central island formed in the upper surface to protect the fastening means from injury by the chips during cutting.

The present invention further relates to a high productivity, high metal removal rate insert having surfaces which descend bi-directionally from the cutting edge toward the center of the insert. The bi-directional descending surfaces form a ridge which bisects the centerline of each corner or nose area of the insert to impart improved impact resistance to the nose area of the insert because the greatest mass is along the ridge which extends from each nose toward the center of the insert.

The present invention further relates to a high productivity insert having a tapered cutting edge configuration which descends toward the center line.

SUMMARY OF THE INVENTION

The present invention is directed to an indexable cutting insert. The insert is polygonal in shape. The insert has an upper surface, which is a rake face, a lower surface adapted to be seated in a tool holder, and side walls extending substantially unbroken therebetween to define the insert. The upper surface of the insert defines a cutting edge along its periphery which descends from the nose area to its lower most point at the center of the insert, and further defines a land, a chip strain surface, and at least one directional chip breaker surface. The chip breaker surface has a tapered configuration which corresponds to the cutting edge and descends bi-directionally from the cutting edge toward the center of the insert. At the center of the insert is an aperture which passes at least partially through the insert. The aperture is surrounded by a raised, angular chip reflecting island which aids in chip breaking and further protects a fastening means by which the chip is retained in the tool holder pocket, from chip flow damage. The insert is further equipped with a resultant ridge which bisects the centerline of the nose area to improve the impact strength of the cutting edge.

DETAILED DESCRIPTION OF THE PREFERRED EMBODIMENTS

Figure 1:
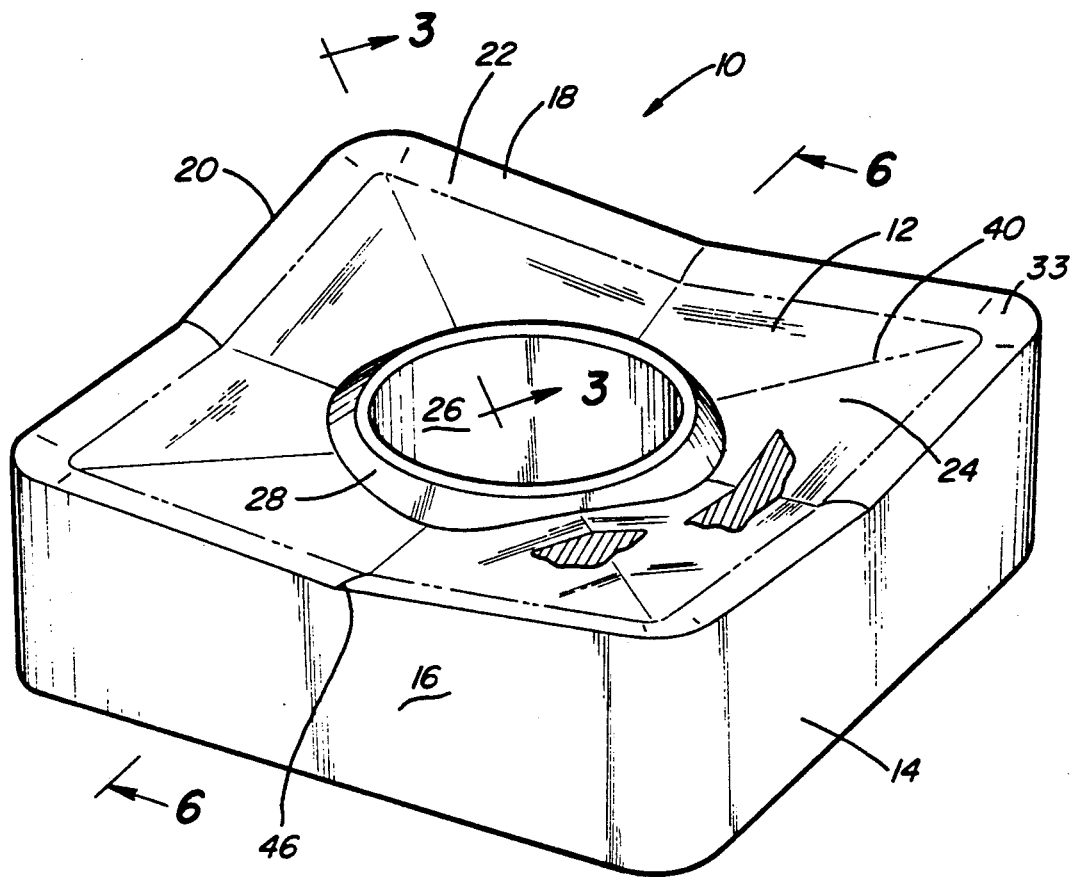
FIG. 1 is a top perspective of the insert of the present application.

Referring now to the drawings, where like numerals depict like structures, and particularly to FIG. 1, there is shown therein a perspective view of the insert 10. The insert shown is polygonal in shape. The insert has an upper surface 12, which forms the rake face, a lower surface (not shown) and a side wall 14 extending substantially unbroken therebetween to define a body 16. The insert as shown is adapted to be seated in a tool holder pocket at its lower surface, and is indexable within such a tool holder.

Upper surface 12 has a tapered cutting edge 18 along its periphery 20, and is further equipped with a land 22, which extends substantially around the periphery of the upper surface and rearwardly of the cutting edge. Rearward of the land is a chip strain surface 24, which extends around the upper surface of the insert adjacent to the land. The upper surface of the insert is provided with at least one bi-directional chip breaker surface formed therein having a tapered configuration corresponding to the configuration of the cutting edge and descending bi-directionally from the land toward the center of the insert and the depth of out line 4—4.

Figure 3:
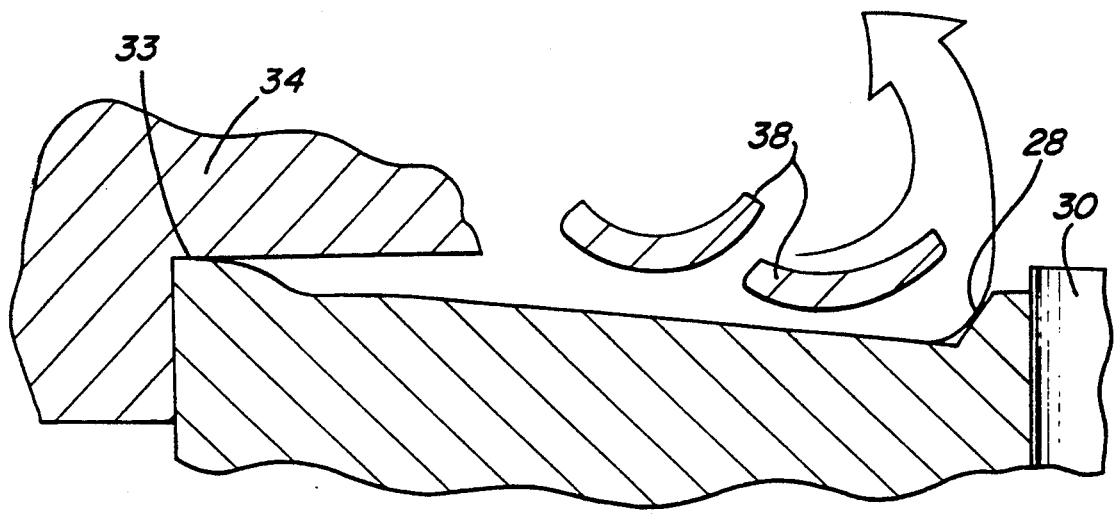
FIG. 3 is sectional view of the insert along line 3—3 showing the cutting action of the insert.

The insert is provided with a central aperture 26 extending at least partially through the body of the insert. The aperture is surrounded with a centrally raised angular chip reflecting island 28 to aid in chip breaking, and further to protect a fastening means 30 (as seen in FIG. 3) from chip flow damage.

The cutting edge is further provided with a ridges along the centerline of the nose area of the insert to improve impact strength of the cutting edge. The ridges are formed by the joining of two different angular surfaces formed in the cutting edge. In the polygonal insert shown in the figures, the ridge is formed by the intersection of a 4 degree angular surface and an 8 degree angular surface at the nose portion 33 of the insert. It will be understood by those skilled in the art that when the insert has a polygonal shape, each corner thereof is a nose portion. It has been found that this combination exhibits greatest improvement in force distribution across the rake face when the center 46 of the insert is in the range of about 0.02 to 0.032, and preferably 0.028 inches lower than the highest point of the insert, normally located at the nose area of the insert.

It is contemplated that the tapered cutting edge and upper surface described reduce localized stress concentrations in the insert along the rake face at the depth of cut line during cutting.

Figure 2:
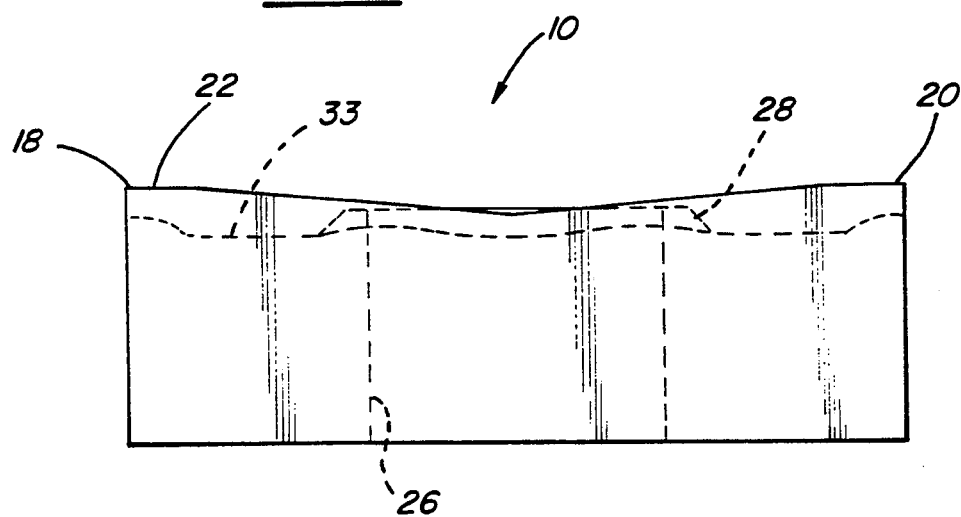
FIG. 2 is a side view of the insert showing the tapered configuration of the cutting edge.

Turning now to FIG. 2, a side elevation of the insert is shown depicting the tapered configuration of the cutting edge and the manner in which the upper surface rake face configuration 32, shown in phantom, corresponds to the configuration of the cutting edge. The correspondence between the upper surface and the cutting edge provides greater impact strength to the cutting edge.

FIG. 3 is a detailed sectional view of the insert of FIG. 1 taken along line 3—3. The insert is shown while cutting a workpiece 34, at its nose portion 33. The chips 38 which are generated as the insert moves through the workpiece are subjected to strain as they move along the upper surface of the insert, until they finally break. As the chips move along the upper surface of the insert, they encounter the raised angular island which is protecting the fastening means 30, shown as an "H" pin. It was a long felt problem in the art that as chips moved along the surface of an insert during the cutting operation, they would encounter the fastening means and move across it, thereby eventually damaging the fastening means and contributing to the costs incurred in cutting operation. The present invention solves this problem by providing for the raised angular island which direct the chips away from the fastening means and thereby contributes to improved tool holder life and reduced cost of operation.

Figure 4:
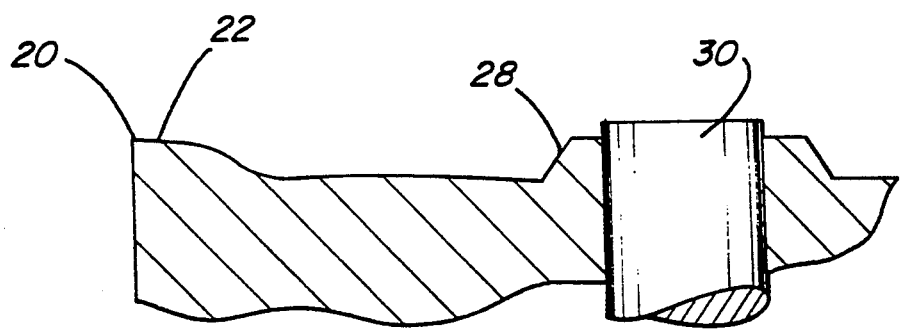
FIG. 4 is a sectional view of the insert along line 4—4

FIG. 4 is a sectional view of the insert of FIG. 1 taken along line 4—4, showing the relatively uniform cross sectional profile of the insert along much of its body.

Figure 5:
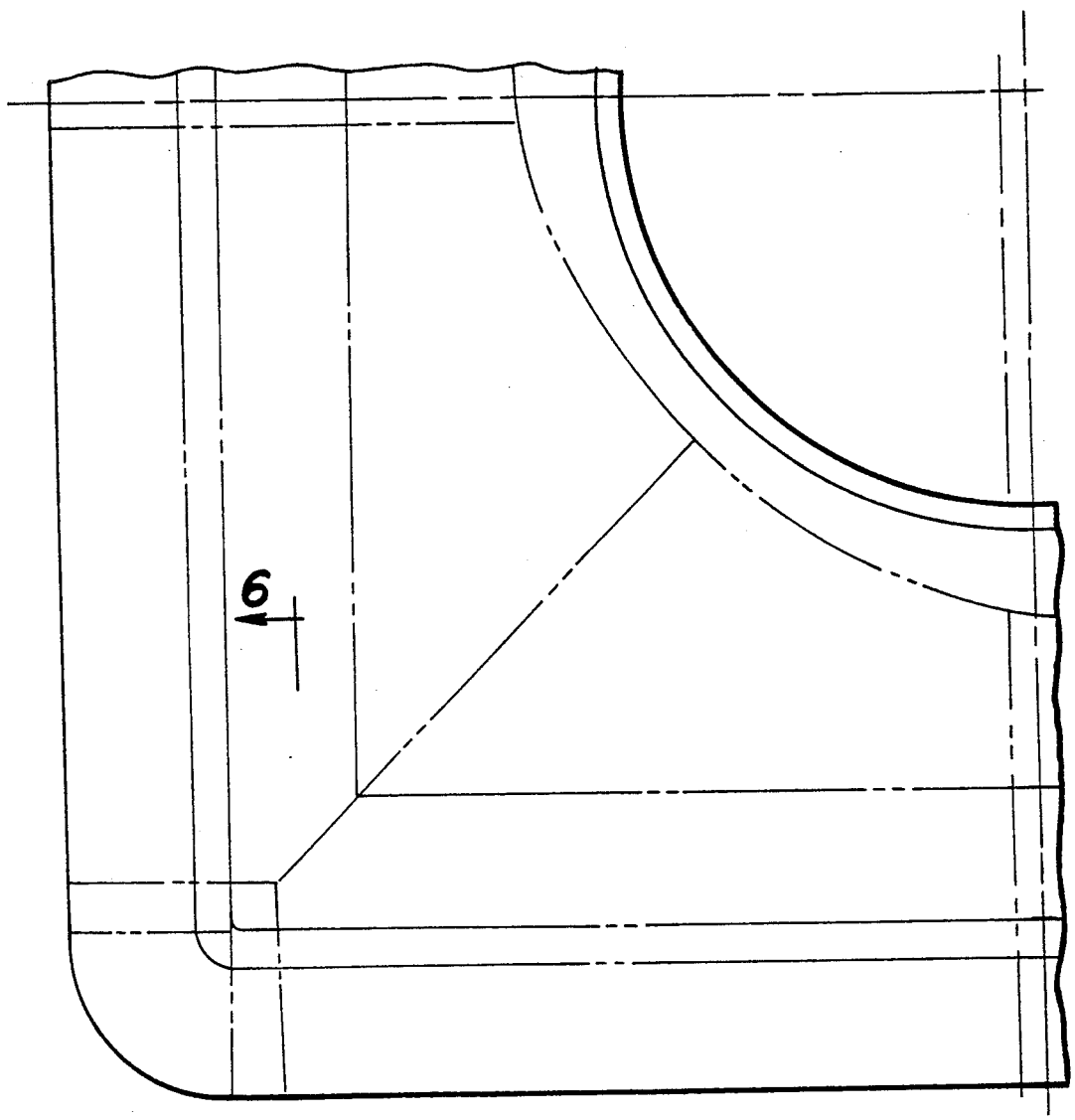
FIG. 5 is a detailed view of the nose portion of the insert showing the resultant ridge.

FIG. 5 is a detailed top sectional view of the nose portion of polygonal insert shown in FIG. 1. At the corner of the insert there is formed the resultant ridge and the land and chip breaker surfaces previously described in connection with FIG. 1.

Figure 6:
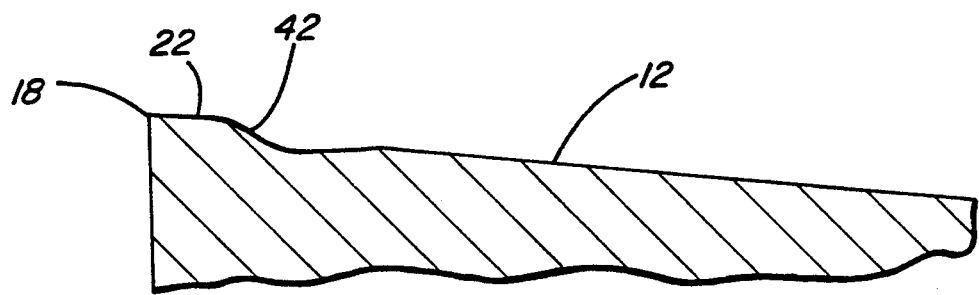
FIG. 6 is a sectional view of the insert along line 6—6.

Referring to FIG. 6, there is shown therein a side sectional view of the nose portion of FIG. 5 taken along line 6—6. As seen therein, the cutting edge and land merge with the chip breaker surface. It can be seen that extra strain is induced on the chips by the resultant ridge 40 which merges into the tapered surface 42 at the nose portion. Such configuration serves to induce extra strain in the chips, and further to impart improved impact resistant properties to the insert.

The insert according to the present invention is capable of high depth, moderate to high metal removal rate from workpiece, like steel, at high to medium cutting speeds and depth of cut. Moreover, it has been observed that the insert of the present invention reduces chatter on long shafts or thin walled parts while efficiently machining those parts at high metal removal rates. The insert transfers a substantial amount of the heat generated during the cutting operation into the chips which results in longer insert life.

Another advantage of the present invention is reduced contact between the chip and the insert while inducing maximum deformation forces into the chips generated at the shear zone for efficient chip breaking. It should now be clear that, because of the tapered configuration of the insert, the chip is induced to curl and break at a wide range of feed rates and depths of cut on a variety of workpiece materials, as well as to strengthen the cutting edge under variable loads and heat fluctuations produced by variations in the depth of cut.

The insert of the present invention is useful at 0.014–0.050 IPR at 0.10 to 0.60 inches of depth of cut, at cutting speeds of about 300–1,200 ft/minute. It is contemplated that the insert is particularly useful on long shaft parts where chatter reduction is critical, pipes and thin walled parts, and where high metal removal rates/high productivity through forged or cast steels in turning and facing operations are desired. The insert of the present invention allows full utilization of machining horsepower and improved rigidity on older machines and reduction of energy requirements and associated costs for heavy cuts.

It will be evident that there are a wide variety of embodiments of the present invention which are not specifically described above but which are clearly within the scope and spirit of the present invention. The above description is therefore intended to be exemplary only and the scope of the invention in limited solely by the appended claims.

We claim:

1. A polygonal indexable cutting insert, comprising: an upper surface which is a rake face, a lower surface adapted to be seated in a tool holder pocket, and a side wall extending substantially unbroken therebetween to form a body; said upper surface defining a tapered cutting edge along its periphery; said edge having its greatest height at each corner of the insert and a bi-directional angle descending therefrom toward a centerline of the insert to define a resultant ridge to impart impact resistance at each said corner; said ridge formed by the joining of two different angular surfaces formed in the cutting edge; a land formed along and rearward from said cutting edge; said body having a tapered configuration corresponding to said cutting edge; and a centrally located aperture extending at least partially through the insert to accommodate a fastener means, whereby said tapered cutting edge imparts improved force distribution across the rake face of the insert, which reduces localized stress concentrations at depth of cut.

2. The insert of claim 1, wherein said aperture extends through the insert and is surrounded by a raised angular island to protect the fastener from chip flow damage during cutting operations.

3. The insert of claim 1, wherein said bi-directional descent angle at a corner is about 8 degrees, and 4 degrees along the side of the insert.

4. The insert of claim 1, wherein said insert has a center which is about 0.02 inches–0.032 inches lower than the corners.

* * * * *